---

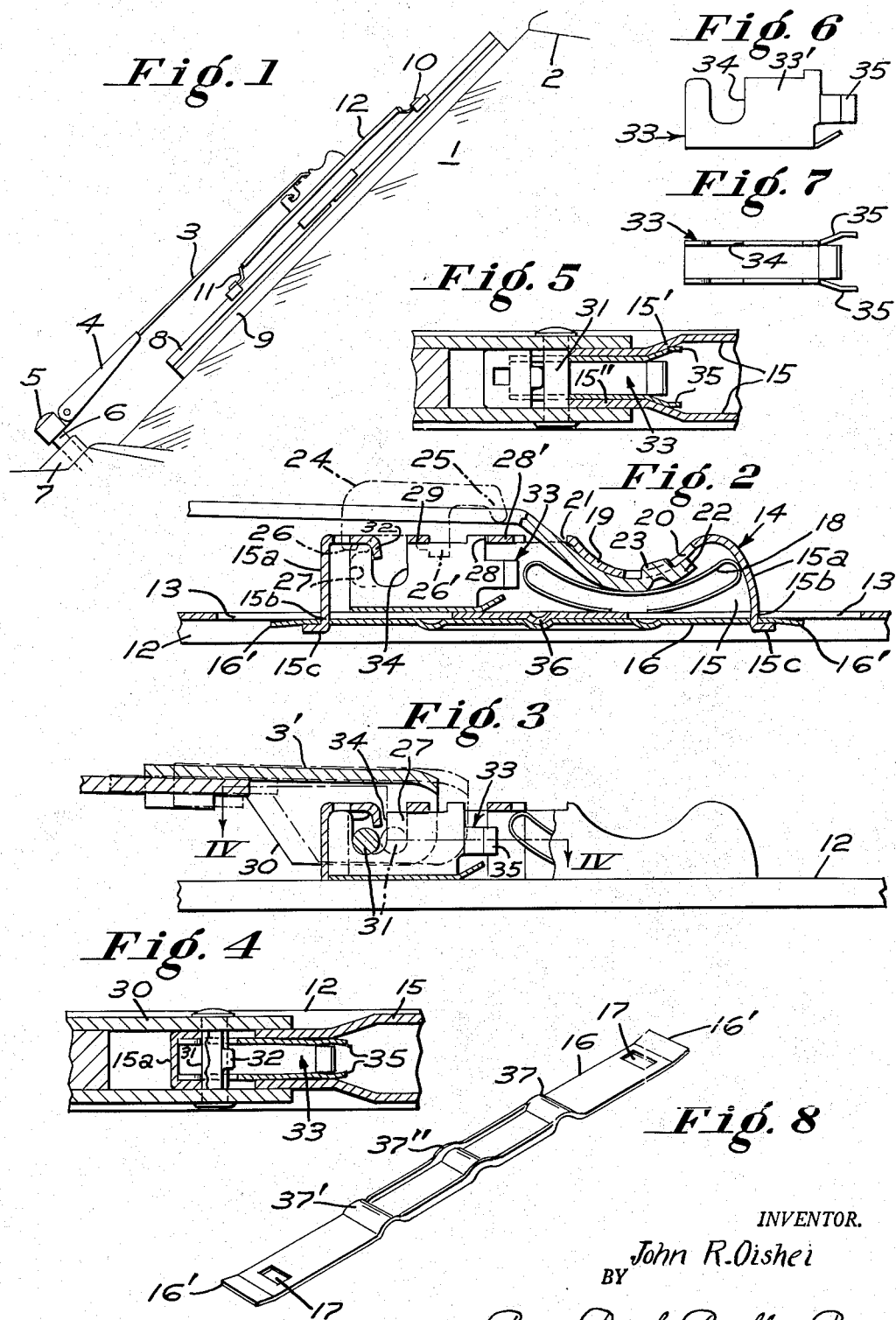

United States Patent Office 2,747,213
Patented May 29, 1956

---

2,747,213

WINDSHIELD WIPER BLADE CONNECTOR

John R. Oishei, Buffalo, N. Y., assignor to Trico Products Corporation, Buffalo, N. Y.

Application November 15, 1952, Serial No. 320,690

8 Claims. (Cl. 15—250)

This invention relates generally to the windshield cleaning art, and more particularly to an improved means for attaching a wiper element to a wiper drive arm for oscillation thereby across a predetermined area of a windshield surface.

Developments in the mode of attaching wipers to their arms have resulted in various styles of mounting or attaching clips, each designed for a particular actuating arm, being currently in use whereby it is necessary for a manufacturer to supply, and a dealer to stock, a plurality of different wiper blades having different types of attaching clips in order to meet the present day demand for replacement blades.

While it has heretofore been proposed to provide a wiper blade with more than one attaching clip means whereby to permit attachment of said blade to different types of wiper drive arms, such multiple attaching clip means present an off-center position with respect to the point of attachment to the drive arm which impairs the wiping efficiency for various reasons such as by causing the wiper blade to hit the windshield frame during its wiping operation or by altering the wiper path from its desired position on the windshield surface.

Accordingly, it is a primary object of this invention to provide a universal wiper blade attaching clip means permitting adjustment of the point of attachment to the drive arm to substantially the mid-point of the wiper blade, and being selectively adjustable to various positions lengthwise of the blade to accommodate the various coupler portions of the attaching clip.

In addition, it is an object of this invention to provide a universal attaching clip having attachment means providing different coupler characteristics, together with means permitting a shifting of the wiper blade relative to the attaching clip to compensate for an off-center location of the attachment means relative to the blade and thereby enable the desired wiper path to be retained.

Another object of this invention is to provide a wiper blade having universal wiper arm attaching means arranged to give preference to the more prevalent modes of attachment for the replacement field.

A further object of this invention is to provide a wiper blade having universal attaching clip means providing a maximum number of different coupling characteristics.

Still another object of this invention is to provide a universal wiper blade of the aforesaid type which is relatively inexpensive to manufacture, simple and compact in construction, and completely reliable and long-lasting in operation.

The foregoing and other objects of this invention will become readily apparent upon a perusal of the ensuing detailed specification, taken together with the accompanying drawing forming a part thereof of and wherein:

Fig. 1 is a view showing the wiper blade of the instant invention mounted in place on a vehicle windshield;

Fig. 2 is a side view in section of the novel wiper arm attaching clip of the instant invention, showing the attachment thereof to one type of wiper actuating arm;

Fig. 3 is a view in section of the novel attaching clip of the instant invention corresponding to Fig. 2 but showing the attachment thereof to a different type of wiper actuating arm;

Fig. 4 is a sectional view, with a portion broken away, taken about on line IV—IV of Fig. 3, showing a portion of the attaching clip mechanism in one position;

Fig. 5 is a view in section corresponding to Fig. 4 but showing the attaching clip mechanism portion in a different position;

Fig. 6 is a view in side elevation of one form of locking member used with the attaching clip of the instant invention;

Fig. 7 is a top plan view of the locking member of Fig. 6; and

Fig. 8 is a perspective view of the friction shoe forming a part of the attaching clip means of the instant invention.

The wiper blade of the instant invention is shown in Fig. 1 mounted on a flat windshield 1 of vehicle 2, being carried by a wiper actuating arm 3 having a spring-enclosing chamber 4 pivoted to an inner mounting section 5. Mounting section 5 is secured on the outer end of a rock shaft 6 journaled in a supporting bracket 7 for imparting an oscillatory movement to the wiper blade across the surface of windshield 1 in a known manner.

The wiper blade comprises a channeled holder 8 formed of inverted channel sections flexibly joined at their adjacent ends and loosely embracing a squeegee 9. Two spaced attaching ears 10 are secured to the back of holder 8 to rockably receive the ends 11 of a pressure distributing yoke member 12, said ends 11 being flat to exert a normalizing influence on the holder and its squeegee. This blade construction is disclosed in detail in copending application Serial Number 185,732 of Erwin C. Horton, now Patent No. 2,659,923.

The universal attaching clip means of the instant invention is adjustably mounted on the holder assembly, as by means of two aligned slots 13 in yoke member 12, and comprises a body or housing 14 having side walls 15 and end walls 15a, which latter are provided with reduced depending extensions 15b slidably received in slots 13. A friction brake shoe 16, preferably in the form of a flat bar or strip, underlies the central portion of yoke 12 and frictionally bears upon the underside thereof, being held in position by tabs 15c passing through openings 17 at opposite ends of said shoe and clinched thereunder as shown in Fig. 2. In this manner, shoe 16 is brought to bear upon yoke 12 with the desired frictional contact whereby to secure the clip body 14 in any given adjustment on yoke 12.

Housing 14 is provided with an interior chamber enclosing at one end a bowed spring element 18 having inturned end portions resting on yoke 12 and a concave intermediate portion bearing upwardly toward an internal convex internal seat 19 on the top wall of housing 14. Seat 19 is formed with a slot 20 at one end thereof and an entrance opening 21 at the opposite end thereof whereupon the curved end or tongue portion 22 of wiper arm 3 is passed through entrance 21 and nested against seat 19 under the urge of opposing spring 18, a stop shoulder 23 on tongue 22 engaging in slot 20 to abut the inner end thereof and thus secure the wiper against displacement from the arm. It will be appreciated that this nested relation permits a limited amount of relative movement of the wiper circumferentially about tongue 22 to enable the wiper to properly rest upon the surface of windshield 1.

Housing 14 is also provided with a coupling fin member 24 mounted on the upper surface thereof and provided with a depending hook 25 spaced from housing 14 to accommodate another known type of wiper arm having, in place of the tongue portion, a slot at its outer end adapted to receive said hook 25. Housing 14 is suitably apertured to receive anchoring lugs 26 and 26' depending from member 24 to mount the latter across the open upper end of a vertical slot 27 in wall 15 of housing 14. It will be observed that lug 26' is formed with an undercut to provide a breakable interlock with a cross bar portion 29 on the upper surface of housing 14, and lug 26 fits through its aperture and is swaged over against the upper surface of housing 14. Thus, when it is desired to attach the wiper blade of the instant invention to a wiper arm having a slot in its outer end, or an earlier type of wiper arm utilizing a transversely extending cotter pin or cross screw, the hook portion 25 of member 24 serves to permit such attachment.

Housing 14 is also provided with an opening 28 adapted to receive an early type of wiper arm terminating in a wire hook that extends therein and engages about cross bar portion 28'.

It will be observed that slot 27, opening 28, and entrance 21 are all blocked by fin member 24. Member 24 is mounted on the attaching clip at the factory, and comprises the only projecting coupler part on the universal clip. Upon removal of fin member 24 access may be had to the several remaining coupler parts described above and to be described further in detail hereinafter for engagement with cooperating coupler parts on other types of arms. Thus, when it is desired to use the wiper blade of the instant invention as a replacement blade on an arm other than that for which fin member 24 is adapted, said fin member is simply detached by the user and for this purpose the anchorage provided by lugs 26 and 26' is readily broken by lightly prying up on the outer end of hook 25 to disengage fin member 24 from housing 14. Since the drawing shows the attaching clip connected to other types of arms requiring the removal of member 24, said member is shown in broken lines only.

With fin member 24 thus removed, slot 27 is adapted to receive still another type of mounting or actuating arm 3' as illustrated in Fig. 3. Instead of a tongue portion, arm 3' is provided at its outer end with depending side wall members 30 supporting a transverse pin 31 spaced from the top wall portion. As is readily apparent from Figs. 4 and 5, walls 15 of housing 14 are inwardly tapered adjacent their inner ends, as at 15', to provide a housing portion of reduced width defined by wall portions 15", and side walls 30 of arm 3' are adapted to straddle and embrace said housing wall portions of reduced width with pin 31 extending into slot 27 transversely of housing 14. Thus, the outer end of arm 3' fits over and embraces the reduced width portion of housing 14, and pin 31 fits down into slot 27 which extends rearwardly beneath an overhanging extension 32 spaced from the forward walls of slot 27 a distance slightly less than the diameter of pin 31 whereby to retain said pin 31 in slot 27 which is substantially greater in width than the diameter of said pin.

In addition, the attaching clip of the instant invention provides a locking member 33 for securely locking the wiper blade to arm 3', which member is shown in Figs. 6 and 7 to comprise a substantially U-shaped member having its side walls 33' recessed adjacent one end thereof to provide a slot 34 to receive pin 31. Slot 34 is of a width just sufficient to receive pin 31. Extensions 35 are provided on the other ends of side walls 33' which extensions are turned outwardly. Member 33 fits within the reduced width portion of housing 14 and in its inoperative position shown in Fig. 5, extensions 35 follow the tapered outline of walls 15' of housing 14. In this position, slots 27 and 34 coincide, and pin 31 can be fitted therein as shown in broken lines in Fig. 3. Then, the blade is pulled outwardly relative to arm 3' whereupon pin 31 is forced to the rearward portion of slot 27 carrying with it locking member 33, which movement causes extensions 35 of said locking member to cam inwardly against their natural spring bias to bear resiliently against walls 15", as clearly shown in Fig. 4, providing a locking position wherein pin 31 is securely locked behind extension 32. Should it be desired to separate the blade from arm 3', it is simply necessary to force said blade rearwardly relative to arm 3' whereupon pin 31 returns locking member 33 to its normal inoperative position illustrated in Fig. 5 and said pin can be removed from slot 27 with a slight prying effort.

Accordingly, it will be seen that the attaching clip means of the instant invention provides multiple coupler arrangements permitting the blade to be adapted to anyone of a number of different conventional wiper arms, together with means such as spring 18 and locking member 33 for securely retaining the blade in position on the more prevalent types of wiper arms currently in use.

It will be noted that certain of the attaching clip coupler parts occupy off-center positions relative to the wiper blade when the clip housing 14 is located centrally of the blade assembly. Thus, the attaching clip portion adapted to receive tongue 22 is forward or outwardly from the center of the blade assembly, whereas the remainder of the coupler portions and particularly that adapted to receive pin 31 of arm 3' are rearwardly or inwardly of the center postion of the blade assembly. The instant invention compensates for this by providing means for slidably adjusting the attaching clip to different positions along yoke 12, as previously indicated. Housing 14 is slidable in slots 13 longitudinally or lengthwise of the blade assembly, and friction shoe 16 can be set to firmly hold the housing in any adjusted position, or the several positions of the clip may be clearly defined by suitable detent means on the friction shoe and on yoke 12. For this latter purpose, yoke 12 is provided with a downwardly extending detent 36 at its midpoint between slots 13 for selectively engaging recesses on friction shoe 16, thereby providing cooperating shoulders on the yoke and clip.

The recesses on the shoe are in the form of transversely extending grooves 37, 37' and 37" each associated with a respective coupling part 27, 28 and 21 and disposed to properly determine the several positions of the attaching clip. Coupling parts 24 and 25 coincide with seats 37' and 37". Of course, any different number of recesses can be provided in the shoe 16, and as previously stated the adjustment may be determined by friction alone.

It will be observed that the opposite ends 16' of shoe 16 are angularly displaced to enable said shoe to move freely along yoke 12 which may be slightly arched. In addition, side walls 15 of housing 14 may be slightly arched to permit the attaching clip to follow the curvature of yoke 12.

Thus, it will be readily appreciated that the adjustable universal attaching clip of the instant invention readily compensates for any off-center attachment by reason of the various coupler portions. Of course, other forms of carrying this adjustment into effect can be utilized without departing from the inventive concept thereof.

Therefore, it is clearly seen that the instant invention fully accomplishes its aforesaid objects, and provides a wiper blade having a universal attaching clip for use with a wide variety of wiper-carrying arms without substantially effecting the location of the wiper path across the windshield surface. While the foregoing description has been given in detail it is without thought of limitation since the inventive principals thereof are capable of assuming other physical embodiments without departing from the spirit of the invention and the scope of the appended claims.

Having completely disclosed this invention, and fully described its mode of operation, what is claimed as new is as follows:

1. A window wiper blade attaching clip for connecting a wiper blade to an actuating arm comprising, a housing, means defining an arm part receiving recess in said housing, shoulder means partially overhanging said recess, and locking means movable in said housing to position an arm part in said recess beneath said shoulder means, said locking means having a laterally extending portion resiliently bearing against said housing to lock the arm part in such position.

2. A window wiper blade attaching clip for connecting a wiper blade to an actuating arm comprising, a recessed housing having a transverse arm part receiving slot therein, means defining an extension partially overhanging said slot, and a locking member slotted to receive a transverse arm part placed in said housing slot and movable with such part within said housing to position the arm part beneath said extension, said locking member having a flared portion resiliently bearing against said housing to hold the arm part in such position.

3. A windshield wiper blade comprising a holder assembly, a squeegee carried by said holder assembly, a wiper arm attaching clip including a housing mounted on said holder assembly, wall means defining a housing portion of reduced width, said wall means being slotted to provide an arm-receiving recess in said housing portion of reduced width, retainer means partially overhanging said recess, and a locking member slidable in said housing portion of reduced width to position a wiper arm beneath said retainer means, said locking member having a laterally extending portion resiliently bearing against said wall means to lock the arm in such position.

4. A windshield wiper blade comprising a holder assembly, a squeegee carried by said holder assembly, a wiper actuating arm attaching clip housing mounted on said holder assembly, said housing having a portion slotted to provide an arm-receiving recess therein, a shoulder partially overhanging said recess, and a locking member movable in said housing portion to position a wiper arm beneath said shoulder, said locking member having a portion resiliently bearing against said housing to lock the arm in such position.

5. A window wiper blade comprising a holder assembly, an elongated wiper element carried by said holder assembly, an arm attaching clip mounted on said holder assembly, said clip including a housing having a portion of tapered wall formation terminating in a portion of reduced width, means providing an arm-engaging recess in said reduced width housing portion, shoulder means partially overhanging said recess, and a substantially U-shaped locking member within said reduced width housing portion, said locking member having upstanding side walls slotted to receive an arm in said recess and lateral side wall extensions adjacent said portion of tapered wall formation, said locking member being movable further into said reduced width housing portion to lock an arm beneath said shoulder means with said side wall extensions bearing against the walls of said reduced width housing portion to hold said locking member in such locking position.

6. A window wiper blade comprising a holder assembly, an elongated wiper element carried by said holder assembly, an actuating arm attaching clip, means mounting said clip on said holder assembly, said clip including a housing having a portion of tapered wall formation terminating in a portion of reduced width, means defining a recess in said reduced width housing portion for receiving an actuating arm part, retainer means extending partially across said recess, and a locking member within said reduced width housing portion, said locking member being adapted to receive an arm inserted in said recess and having lateral side wall extensions adjacent said housing portion of tapered wall formation, said locking member being movable with an arm in said recess further into said reduced width housing portion whereby to lock such arm beneath said retainer means with said lateral extensions bearing against said reduced width housing portion to hold said locking member in such locking position.

7. A wiper blade attaching clip adapted for attachment to an actuating arm having a transverse part comprising, a housing having a top wall portion and spaced side wall portions each slotted to receive a transverse arm part, the side wall slotted portions being enlarged to extend beneath an overhanging top wall portion, a locking member within said housing having an upstanding wall part slotted to receive a transverse arm part, said locking member being movable within said housing between a first position wherein said slotted wall part is alined with said slotted top and side wall portions to receive therewith a transverse arm part and a second position wherein said slotted wall part is alined with said enlarged slotted side wall portions and with said overhanging top wall portion to enclose such transverse arm part, and means carried by said locking member resiliently bearing against a housing wall portion for frictionally retaining said locking member in said second position.

8. A wiper blade attaching clip adapted for attachment to an actuating arm having a transverse pin comprising, a housing having a top wall and spaced side walls including tapered side wall portions providing a housing portion of reduced width, the top and side walls of said reduced width housing portion being slotted to receive therein a transverse pin and said side wall slotted portions being enlarged in a direction away from said tapered side wall portions to extend beneath an overhanging member carried by said housing, and a locking member within said reduced width housing portion having spaced upstanding walls slotted to receive a transverse pin and outwardly tapering resilient extensions at the ends thereof adjacent said tapered side wall portions, said locking member being movable between a first position with said slotted upstanding walls alined with said slotted top and side wall portions to receive therewith a transverse pin and with said tapered extensions generally following said tapered side wall portions and a second position with said slotted upstanding walls alined with said enlarged side wall slotted portions and said overhanging member to enclose such transverse pin, whereby said tapered extensions will resiliently bear against said spaced side walls to frictionally retain said locking member in said second position.

References Cited in the file of this patent
UNITED STATES PATENTS

| | | |
|---|---|---|
| 2,276,556 | Zaiger | Mar. 17, 1942 |
| 2,432,691 | Smulski | Dec. 16, 1947 |
| 2,432,693 | Anderson | Dec. 16, 1947 |
| 2,643,410 | Nesson | June 30, 1953 |
| 2,703,900 | Nesson | Mar. 15, 1955 |
| 2,703,901 | Nesson | Mar. 15, 1955 |